United States Patent [19]
Hulsman

[11] Patent Number: 5,869,747
[45] Date of Patent: Feb. 9, 1999

[54] FOOD CONTAINER INTERNAL PRESSURE ANALYSIS

[75] Inventor: William H. Hulsman, 25 Happy Hollow Rd., East Falsmouth, Mass. 02536

[73] Assignee: William H. Hulsman, North Falmouth, Mass.

[21] Appl. No.: 857,367

[22] Filed: May 15, 1997

Related U.S. Application Data

[60] Provisional application No. 60/018,124 May 22, 1996.
[51] Int. Cl.⁶ .......................... G01S 13/34; G01M 3/24; G01L 11/00
[52] U.S. Cl. ........................ 73/52; 73/49.3; 73/579; 73/592; 364/508; 364/558
[58] Field of Search ................ 73/52, 49.3, 41, 73/579, 592; 364/507, 508, 558

[56] References Cited

U.S. PATENT DOCUMENTS

| | | | |
|---|---|---|---|
| 2,257,830 | 10/1941 | Wolff et al. | 250/1 |
| 2,268,643 | 1/1942 | Crosby | 250/1 |
| 3,366,953 | 1/1968 | Stahler | 343/12 |
| 3,680,092 | 7/1972 | Scott | 343/7 A |
| 3,802,252 | 4/1974 | Hayward et al. | 73/52 |
| 4,117,718 | 10/1978 | Hayward | 73/52 |
| 4,213,329 | 7/1980 | Raymond et al. | 73/52 |
| 4,223,790 | 9/1980 | Yoshida | 209/590 |
| 4,313,171 | 1/1982 | Shibasaki | 364/558 |
| 4,399,514 | 8/1983 | Hamasaki et al. | 364/558 |
| 4,406,157 | 9/1983 | Miyahara et al. | 73/52 |
| 4,435,708 | 3/1984 | Kyriakos | 343/12 A |
| 4,503,401 | 3/1985 | Kyriakos et al. | 331/4 |
| 4,907,443 | 3/1990 | Pailler | 73/52 |
| 5,033,287 | 7/1991 | Wananabe et al. | 73/52 |
| 5,072,223 | 12/1991 | Hethuin et al. | 342/122 |
| 5,175,553 | 12/1992 | Le Garrec | 342/85 |
| 5,315,258 | 5/1994 | Jakkula et al | 324/640 |
| 5,353,631 | 10/1994 | Woringer et al. | 73/52 |
| 5,585,567 | 12/1996 | Van Manen | 73/702 |
| 5,675,074 | 10/1997 | Melvin, II | 73/52 |

Primary Examiner—Hezrone E. Williams
Assistant Examiner—J. David Wiggins
Attorney, Agent, or Firm—Jones, Tullar & Cooper PC

[57] ABSTRACT

A sensor structure for use with container inspection systems utilizes a continuous-wave (CW) microwave radar to measure the curvature or the vibration characteristics of a container wall through a thick corrugated cardboard case top or on a single item container processing line. A radar antenna directs RF energy toward cans moving along a conveyor. The antenna emits a beam which, over time, illuminates a narrow region along a line from one outer edge of the can to the opposing outer edge, as the can passes the antenna. During this time, a continuous measurement of the relative change in distance from the antenna to the top of the can is generated and sampled for acquisition by a computer, and an estimate of the profile is made from changes in the distance measurement. The profile is used as a measure of the internal pressure of the can or as an indication of the presence of manufacturing defects. In a second embodiment, the resonant vibration frequencies and amplitudes of the container are measured and analyzed from the changes in distance measurement. The vibration characteristics are an alternative measure of the internal pressure of the container or indication of the presence of manufacturing defects. The sensor embodiment is chosen to obtain the most reliable detection criteria for a specific type of container or product.

20 Claims, 7 Drawing Sheets

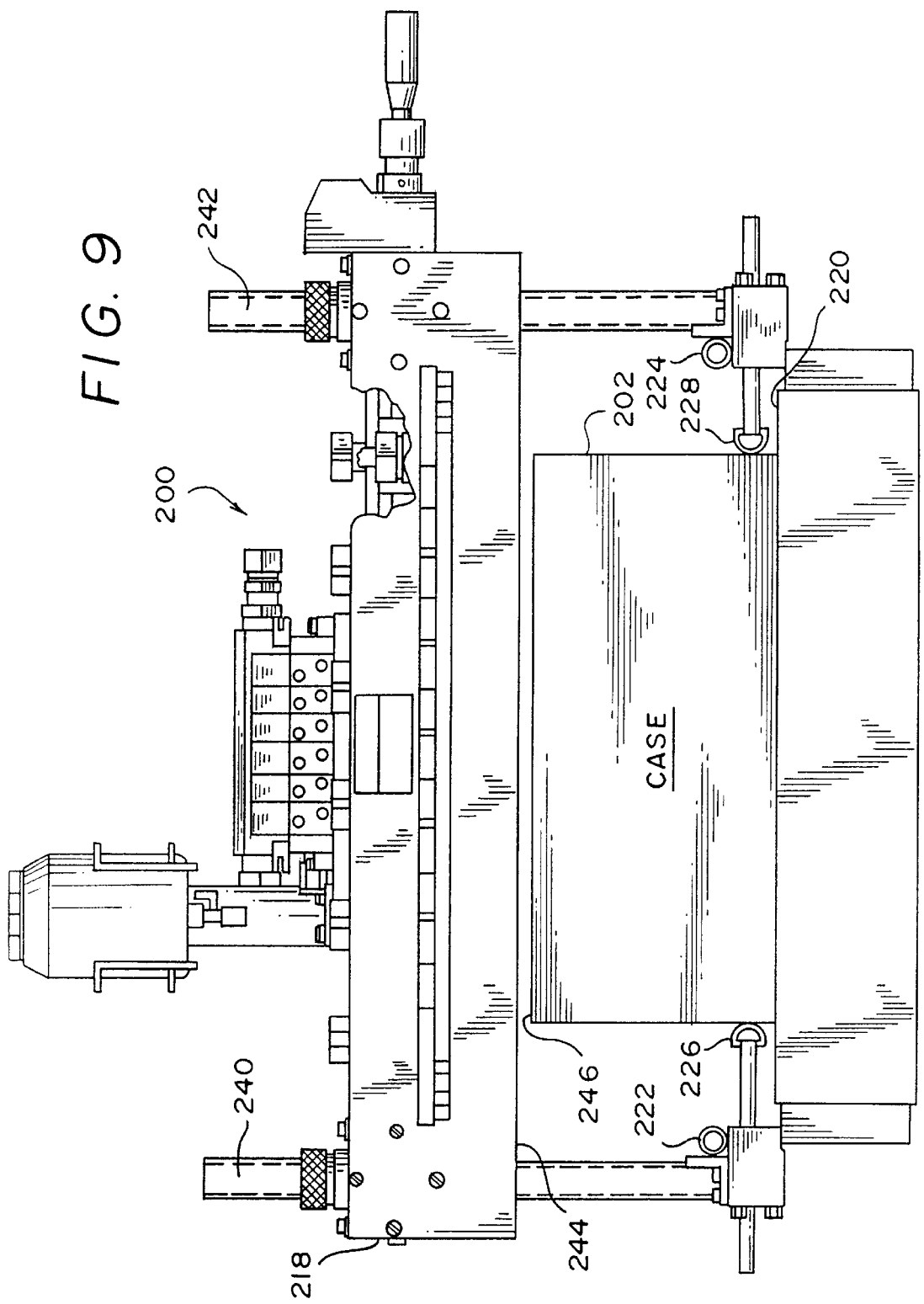

FOOD CONTAINER INTERNAL PRESSURE ANALYSIS

BACKGROUND OF THE INVENTION

This application claims the benefit of U.S. Provisional Application No. 60/018,124, filed May 22, 1996, the disclosure of which is incorporated herein by reference.

The present invention relates, in general, to a sensor for determining internal pressure in a container having a flexible wall, and more particularly to a container inspection system which includes a sensor for measuring the shape of a container wall or for determining the resonant vibration characteristics of the wall to provide an indication of the pressure or vacuum within the container.

It is frequently essential to inspect containers of various kinds, and particularly food and beverage containers, to determine whether they have the desired internal pressure, since insufficient vacuum or a positive internal pressure may indicate a leaky container, insufficient evacuation, improper ingredients, or food spoilage. Furthermore, aerosol cans need to be checked to see if they contain sufficient positive internal pressure, and carbonated beverage cans need to be measured to see whether the contents have gone flat due to leakage, and a variety of methods and devices have been developed for this purpose. One such device is described in U.S. Pat. No. 3,802,252, assigned to the assignee of the present application, which discloses a pressure and vacuum monitoring system generally referred to as an electromagnetic pulse system. This device utilizes a transducer coil and means for discharging an electrical pulse through the coil to produce a magnetic field pulse which resiliently deflects an adjacent flexible wall of a container under test. This deflection causes the wall of the container to vibrate and to produce an acoustical response which is a function of the internal pressure in the container. Any change in the internal pressure usually changes the tension on the container wall, causing the resonant frequency and amplitude of the acoustic response to change. The acoustic energy of the vibrating wall is detected with a microphone and its frequency and amplitude content are analyzed to distinguish failed containers from good containers. The wall selected for measurement is usually the end wall of a metal can, or is the metal cap or lid for other containers such as plastic or glass jars or bottles.

Although the electromagnetic pulse system has been found to be useful and reliable for many container applications, it may not always be effective in discriminating between good and bad containers, particularly in three different situations. First, it has been discovered that a can end or container lid may generate similar acoustic responses at two different internal pressures, one under vacuum (or a negative pressure) with the container wall curved inwardly, and the other under a positive pressure with the wall curved outwardly. Because of this, the testing may be unacceptably ambiguous, for one condition is usually acceptable while the other is not. Second, the amplitude of the acoustic response of a container may be attenuated by a case or carton used to package a cluster of the containers. In such a situation, there may be an insufficient signal-to-noise-ratio to provide reliable discrimination between containers with acceptable and unacceptable internal pressures, or to provide sufficiently low false reject rates. Third, acoustically noisy background environments may degrade the signal-to-noise ratio, also causing unreliable bad versus good container discrimination or unacceptable false reject rates.

To overcome the foregoing problems, the system of U.S. Pat. No. 4,177,718, also assigned to the assignee of the present application, was developed. In this second system, a passive sensing approach was adopted. Three inductive coil sensors were arrayed to sense the passing of a pressurized container by detecting changes in an inductive magnetic field, thereby to measure the amount of deflection of the container flexible wall as a function of internal pressure. However, these sensors generated a continuously changing magnetic field rather than a magnetic impulse. Thus, in accordance with the '718 patent, the instantaneous distance between the ends of at least two sensing coils and the surface of a can wall directly beneath the sensing coils was measured. The profile of the top of the can was then estimated by comparing the sensing coil measurements.

One problem with this second system was that an inductive distance sensor must be in relatively close proximity to the container wall in order to make an accurate measurement, for inductive sensors are only useful within a maximum "standoff" range, or distance to the container wall, of approximately one quarter of an inch. As a result, it was very difficult to sense the internal pressure of containers which were packed in a closed case or carton, for example, for such closed cases often have more than one layer of corrugated cardboard or the like between the can end and the sensor, thus exceeding the maximum standoff range. An excessive standoff range can also be encountered when the containers have settled in the case.

A second problem with the inductive sensor system is that it is not always sensitive enough to measure small changes in the shape of a container lid or wall, even though there is an unacceptable change in pressure. This situation occurs when the container wall is relatively stiff and does not change shape very much with changing pressure. For this type of container, the use of changes in vibration resonant frequency and amplitude as the discriminating characteristic frequently provides better results.

Thus, a different sensor type is required to address the problems of insufficient standoff range and weak acoustic signal reception in inspecting the internal pressure of containers.

SUMMARY OF THE INVENTION

It is, therefore, an object of the present invention to provide apparatus for accurately, rapidly, and inexpensively measuring the amount of deflection, or the resonant vibration frequency and amplitude, of a flexible wall of a container without contacting the container.

It is another object of the invention to provide a method for estimating the internal pressure of several container types and applications through the measurement of deflection or resonant vibration characteristics of the container.

It is another object of this invention to provide apparatus for accurately, reliably and unambiguously measuring the deflection or resonant vibration characteristics of container walls from a standoff range which permits pressure testing of containers packed in corrugated cardboard cases.

It is another object of the present invention to provide an economical, rapid and convenient method for measuring the internal pressure of containers from a standoff range of an inch or more.

It is another object of this invention to measure the profile or vibration characteristics of crushed or dented containers to detect container processing defects.

Briefly, the present invention is directed to a sensor structure for use with container inspection systems. In particular, the sensor consists of a continuous-wave (CW)

microwave radar transmitter and receiver which will measure either the profile of a curved container wall or the resonant vibration frequencies and amplitudes of a container wall. Still more particularly, the sensor of the present invention is capable of measuring container wall characteristics when the container is enclosed in a thick corrugated cardboard case, even when the container wall to be measured is located a distance below the top of the case.

In one embodiment, the sensor incorporates a radar transceiver connected through a transmission line (or delay line) to an antenna mounted adjacent a measuring region where containers to be measured are located. The antenna is stationary and directs radio frequency (RF) energy toward the region while the containers are moved past the antenna as by a conveyor belt, or the like. The antenna emits a narrow, collimated beam of RF electromagnetic waves which illuminates a narrow region of the surface of a container as it is carried past the antenna, the illuminated region tracing a line from one edge of the container to the opposite edge as the container moves past the antenna. The beam is reflected back to the antenna and this reflected beam is received and analyzed to obtain the profile of the container surface from edge to edge. From this profile the curvature of the container surface is measured, including its nearest and most distant points.

In a second embodiment of the invention, the container wall is caused to vibrate, and the sensor of the invention responds to the motion of the wall to measure the resonant frequencies and spectral amplitudes of the vibration. Because the change in distance from the sensor due to vibratory motion of the container wall typically is much less than the change in distance due to a pressure-induced curvature profile, the sensor of the invention utilizes a different transmission line between the radar transceiver and the antenna for each type of measurement. A relatively long transmission line is used in the first embodiment to provide a relatively large working range for the sensor. This allows profile measurements, but results in a lesser resolution and a reduced ability to detect vibrations. In the second embodiment, therefore, the transmission line is shortened to greatly increase resolution, but at the expense of the working range. This makes the second embodiment less suitable for measuring profiles, but allows measurement of small vibrations. Accordingly, by changing the length of the transmission line the sensor of the invention can be used to provide high resolution or a large working range (depth of field), whichever is most useful for determining the internal pressure of a particular container.

In the second embodiment, the sensor includes a radar antenna mounted, as in the first embodiment, adjacent a measuring region where containers are moved past the stationary antenna. In addition, the sensor includes a stationary electric coil mounted adjacent the path of the container and a circuit for discharging an electrical current pulse through the coil to magnetically induce vibrations in the adjacent container surface which is to be measured. Thus, as the container moves past the coil and antenna the current is discharged through the coil to produce a rapidly changing magnetic field which causes the surface of the container to vibrate while the continuously emitted beam of electromagnetic waves from the antenna illuminates an area on the top of the container surface, the beam tracing, for example, a line across the top wall of the can. At least a part of the emitted beam is reflected back to the antenna and this reflected beam is received and analyzed after the container has been excited by the magnetic pulse from the coil to determine the frequency and amplitude of the vibrations in the area of the container surface which is illuminated by the antenna beam.

In both embodiments, during the interval within which the container passes the antenna a continuous measurement of the range from the antenna to the surface of the container is generated from the reflected beam, and this measurement is periodically sampled over time to provide a series of instantaneous range measurements for acquisition by a computer. In the first embodiment of the invention described above, an estimate of the curvature is trade from changes in the instantaneous range measurement over the time of passage of the container, and the curvature is used as a measure of the internal pressure of the container. In the second embodiment described above, the amplitudes and frequencies of the vibration of the container surface which is illuminated by the antenna are determined from the measurements of the changing range between the antenna and the surface of the container as it vibrates. The resonant frequencies of the container surface and their amplitudes are used to determine the internal pressure of the container.

It will be understood that although the system of the invention is capable of measuring a single container passing under the sensor, normally the measurements will be made of a multiplicity of containers being advanced in series along a conveyor or of multiple containers in a case or carton formed of plastic or cardboard, with the containers being moved in sequence past the sensor. The container surface being measured will normally be the end wall of a can or the metal lid on a bottle or jar, with the containers being carried past an overhead sensor in an upright position. If desired, however, the containers can be in a horizontal or other position, with the sensor located beside the path along which the containers move to illuminate the nearest surface of the container to measure its shape and/or vibration characteristics. These shape and vibration characteristics are used to determine the internal pressure of each of the containers, as will be described. The measurement of internal pressure as used herein refers to either positive or negative (vacuum) pressures, with such measurements being made by the sensor of either the first or the second embodiments to permit quality control determinations, such as accept or reject decisions, for each container passing the antenna. As is known in such systems, rejected containers can be marked or removed using conventional automated machinery.

The sensor includes a transceiver having an RF transmitter and an RF receiver. The transmitter incorporates a voltage controlled oscillator (VCO) to vary the frequency of radio frequency (RF) electromagnetic waves transmitted from an antenna. These waves are directed toward the surface of a target, which is the container to be measured, are reflected from surface to the antenna, and are directed back to a mixer at the RF receiver. The phase relationship between the transmitted waves and the received waves is maintained at a constant value by adjusting the VCO to change the frequency (and hence wavelength) of the transmitted waves as the range to the target container changes. This adjustment is made by frequency control electronics connected to monitor the phase relationship between the transmitted and received signals superposed at the mixer in the transceiver. The control electronics provide a control signal to the VCO to adjust the frequency and thus the wavelength of the transmitted RF waves to maintain a standing wave with a node at the mixer and a fixed number of half wave intervals between the mixer and the container wall. Since the adjustment of the VCO is a function of the change in distance to the container, the control signal to the VCO at any given instant in time can be used as a measure of that distance.

A transmission line, or delay line, is connected between the transceiver and the antenna, and the length of the line establishes the number of half wave length intervals between the transceiver and the target container wall to be measured. This line is selected to produce the optimum working range and the optimum resolution for the particular use of the sensor. The working range of the sensor is the range of distances from the antenna over which usable measurements can be obtained by varying the VCO. In general, the greater the working range, the lower the resolution of the sensor, as discussed above.

The sensor of the present invention advantageously incorporates an off-the-shelf CW microwave transceiver customarily used by the police to measure the speed of motor vehicles. However, the VCOs in such transceivers have a limited frequency band which limits the variations in distance to a target, i.e., the variation in shape of a container wall, which can be measured. In accordance with the invention, therefore, different lengths of transmission line are provided between the transceiver and the antenna to vary the working range of the sensor. To measure changes in the profile of a container wall, for example, a large working range which will measure distance variations of up to 0.5 inches is desirable with distance resolutions on the order of $1 \times 10^{-4}$ inches. To measure the vibration frequency and amplitude of a container wall, a small working range which will measure distance variations of less than 0.050 inches is required, with distance resolutions on the order of $1 \times 10^{-7}$ inches. The use of a long delay line, on the order of 6 feet, increases the number of standing waves between the transceiver and the antenna. This allows the frequency band of the transceiver to cover a large working range variation for measuring container wall profiles. The use of a short delay line, on the order of a few inches, increases the distance resolution of the system by only supporting a small number of standing waves. The shorter delay line decreases the distance variation the radar system is able to measure. Changes to the gain of the mixer output signal may be required to allow the radar system to work effectively for a specific application.

BRIEF DESCRIPTION OF THE DRAWINGS

The foregoing and additional objects, features and advantages of the invention will become apparent to those of skill in the art from the following detailed description of a preferred embodiment, taken with the accompanying drawings, in which:

FIG. 9 is a front elevation view of an adjustable height measurement bridge for the container inspection system of the present invention.

DETAILED DESCRIPTION OF PREFERRED EMBODIMENT

Figure 1:
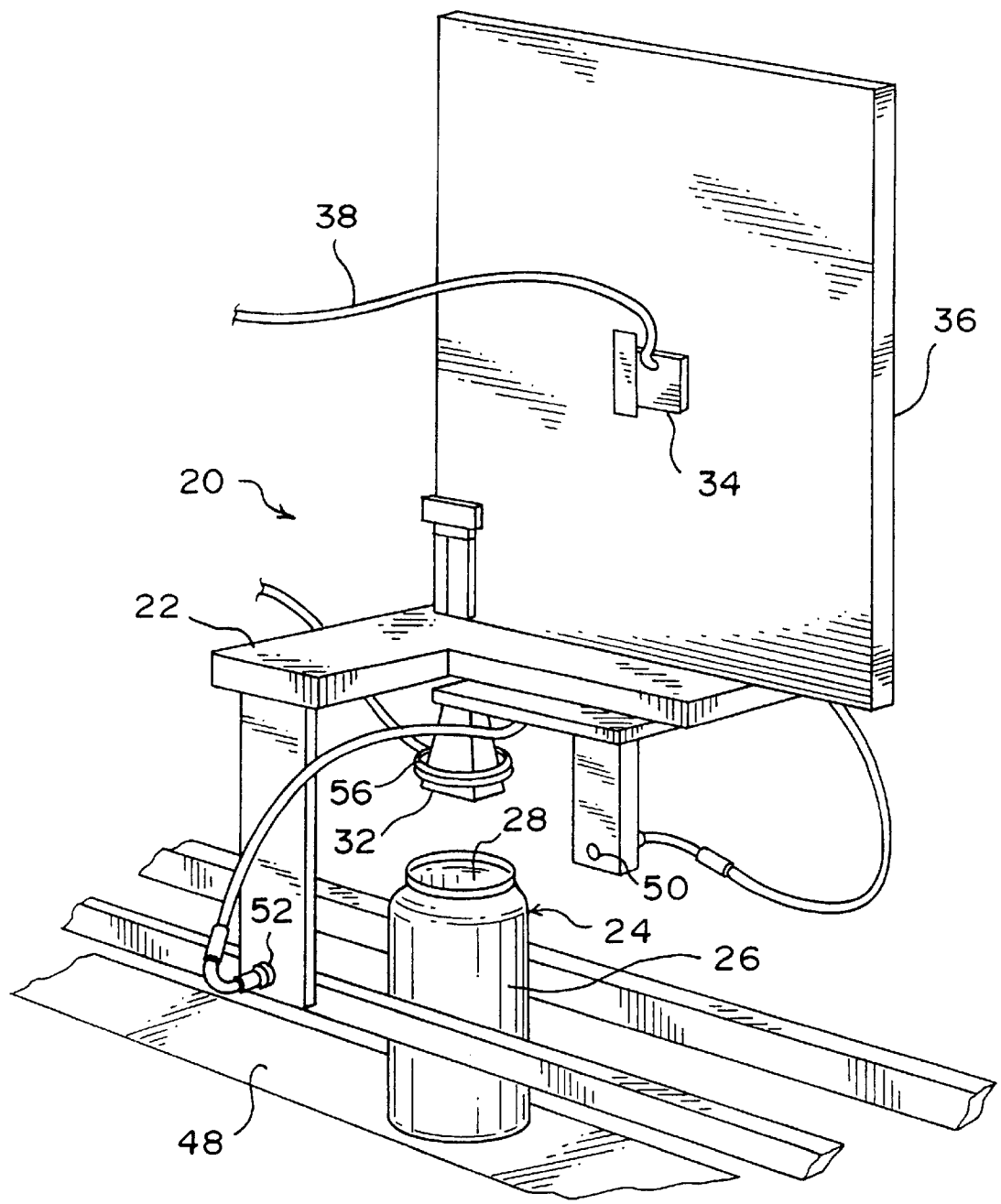
FIG. 1 is a perspective view of a container inspection system for measuring pressure in cans with the radar sensor of the present invention.
Figure 2:
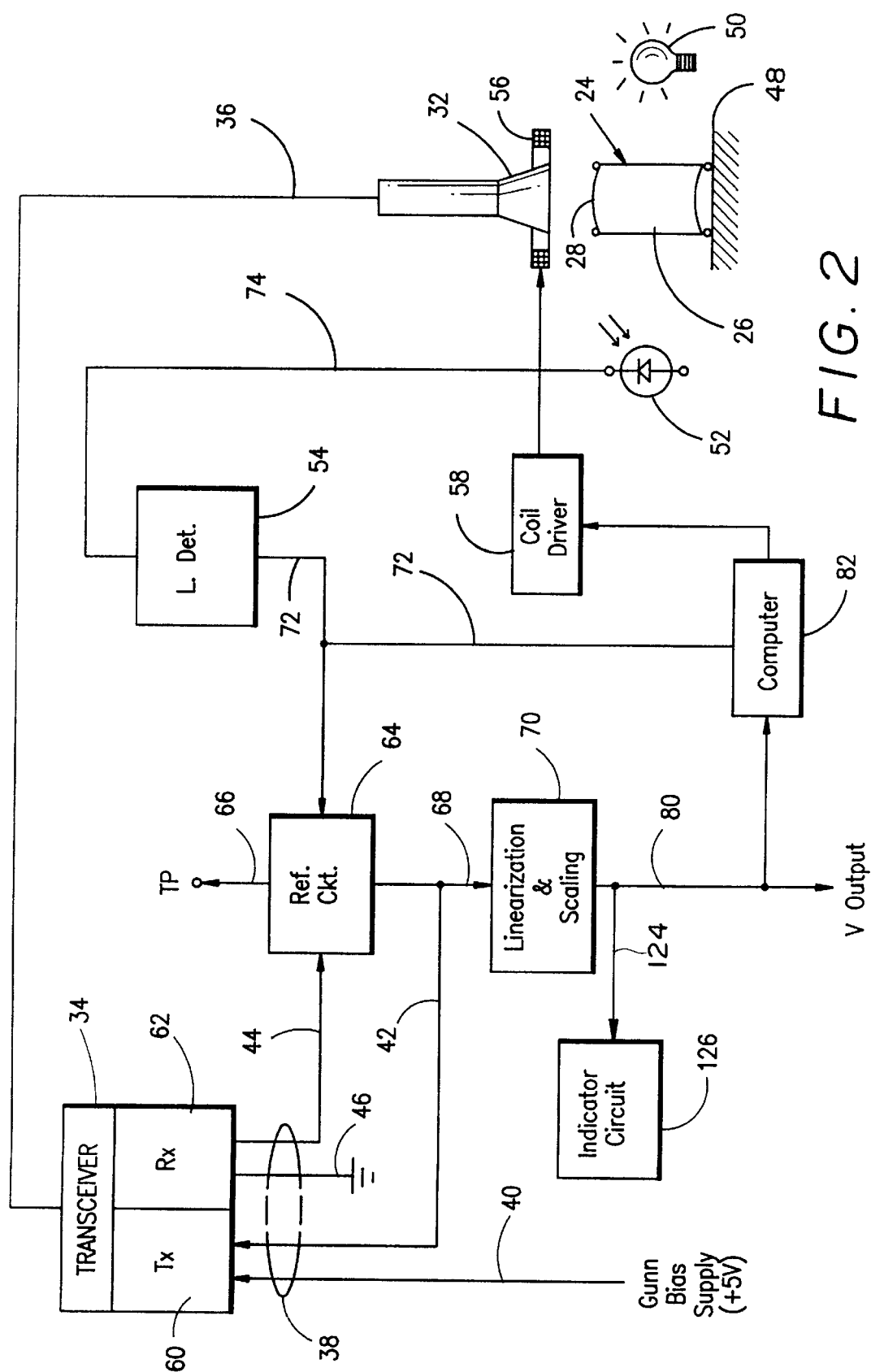
FIG. 2 is a block diagram of the radar sensor of the present invention.

Turning now to a more detailed description of a preferred form of the invention, there is illustrated in diagrammatic form in FIG. 1 an internal pressure analysis sensor 20 for noncontacting measurement of containers. The sensor is supported on a frame 22 adjacent the location of a container, such as a can 24, which is to be evaluated. The can 24 includes a side wall 26 and an end wall, or surface 28 which is to be measured. This can end 28 is electrically conductive and is flexible so that it has a surface contour which changes with internal pressure in the can, and which, when induced to vibrate, exhibits resonant frequencies and amplitudes which change as a function of pressure within the can 24. Sensor 20 measures the distance to the surface of the can end by reflected radio frequency (RF), or microwave, energy as the can moves past the sensor, or vice versa, and so functions as a radar system. Thus, RF energy is transmitted toward the can end 28 from an antenna 32, which is connected to a radar transceiver 34 by way of a transmission line generally indicated at 36. As illustrated in FIG. 2, the transceiver is also connected to control circuitry (to be described) by way of a four conductor cable 38 which includes a Gunn diode bias (+5V) supply line 40, a Varactor diode tuning input line 42, a Mixer diode output line 44, and a common or ground line 46.

As illustrated in FIGS. 1 and 2, the can 24 is supported by a conveyor 48, which serves to move the can along a path which passes through the RF beam of the antenna 32. A light source 50 emits a light beam which is directed across the conveyor 48, transversely to the path followed by the can, to a light sensor 52 connected to a light detector circuit 54. When the light beam is interrupted by the presence of a can 24 on the conveyor, the light sensor produces an output which causes detector 54 to trigger the sensor 20 to measure the contour of the can end 28. If it is desired to measure the vibration frequencies and amplitudes of the can end 28, a mechanism for producing such vibrations is provided and is also activated by the light detector. Such a mechanism may be an electrical coil 56 adjacent the path of the container and connected to a driver circuit 58. This circuit is activated to produce a current pulse in coil 56 when it is desired to induce vibrations in the can end 28 for the purpose of determining the internal pressure of can 24 by measuring its resonant vibration frequency and amplitude. As illustrated, the coil preferably surrounds the antenna 32 so that it is close to, or adjacent the surface to be vibrated and measured.

The transceiver 34 may be a commercially available upper K band transceiver, such as the M/A-COM model MA 87729, and includes a varactor diode (frequency controlled) transmitter section 60 and a receiver section 62 which includes a mixer diode, in conventional manner. The mixer output line 44 from the receiver section 62 is connected to a reference circuit 64. Circuit 64 is connected by way of line 66 to a test point TP, by way of line 42 to the transmitter section 60, and by way of line 68 to a linearizing and scaling circuit 70. Another input to reference circuit 64 is by way of line 72 from the light detector circuit 54 which is connected to light sensor 52 by way of line 74.

Reference circuit 64 is a control circuit which tracks changes between the can end 28 and the antenna and modulates the frequency of the transmitter. After the can 24 enters the region of the conveyer adjacent the antenna and interrupts the light beam from source 50 to trigger detector 54, an output from detector 54 is applied to line 72 to cause the reference circuit to produce a control signal on line 42. This control signal varies the frequency of the continuous output transmitter 60 which emits RF energy through line 36 to the antenna 32. The antenna directs this RF energy in a beam toward the can end 28, and at least a part of this beam is then reflected from the surface of the can end 28 back into the antenna 32. The reflected RF energy then travels back up the transmission line 36 and into a mixer diode within the receiver section 62 of transceiver 34. A mixer diode signal is generated within the receiver section and is sent by way of line 44 to the reference circuit 64 for processing.

The reference circuit 64 responds to the mixer diode signal to generate a feedback voltage signal on line 42 that is used as an input to a varactor diode in the voltage controlled oscillator of the transmitter section 60 of the transceiver. This feedback voltage signal is also supplied by way of line 68 to the linearizing and scaling circuit 70, which generates an output signal on line 80. This is a "V output" signal derived from the feedback signal value, and is a linear function of the instantaneous distance between the can end 28 and the antenna 32. The V output signal is sampled for acquisition by a measurement computer 82 which is triggered by the output signal on line 72 from the detector circuit 54 to take a series of range measurements.

The reference circuit 64 includes an adjustment reference for height setup when the antenna 32 has been positioned with respect to the path of the can 24 to provide a nominal mid-range V output signal as the can passes by. Changes from this nominal value produce feedback voltages on line 42 to adjust the VCO and to thereby provide a measure of the can end surface profile as the can passes the antenna.

An alternative embodiment may be used when it is more reliable to measure the internal pressure of can 24 using its resonant vibration frequency and amplitude. In this case, when a can is present, the computer 82 commands coil driver 58 to cause a current pulse to flow through coil 56. This produces a magnetic field which induces eddy currents in the conductive can end 28 which in turn generate a pressure impulse on the lid. This pressure impulse, which is caused by the back electromagnetic force that results from the opposing fields generated by the coil and the eddy currents induced in the can end 28, excites vibrations in the can end. The timing of the computer command that generates the coil current and the resulting can excitation is synchronized with the entry of the can into a measuring zone adjacent the antenna by the signal generated on line 72 by the light detector circuit 54 when the can 24 is present.

Figure 3:
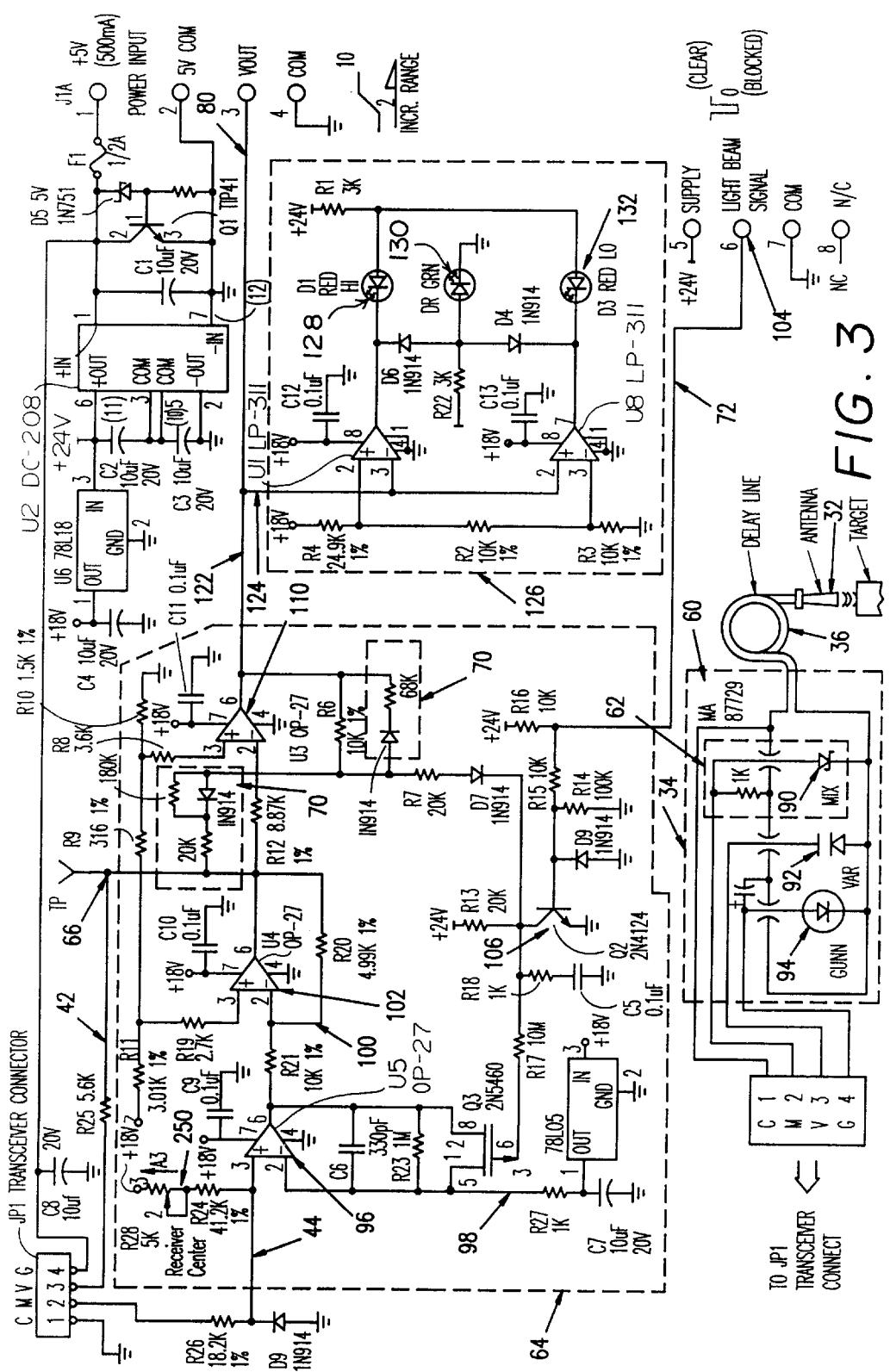
FIG. 3 is a schematic diagram of a preferred circuit for the radar sensor of the present invention.

FIG. 3 is a schematic diagram of one embodiment of the radar sensor of the present invention, wherein the block diagram of FIG. 2 is illustrated in dotted lines, and is similarly numbered. As illustrated, the receiver section 62 of the transceiver 34 includes a mixer diode 90, for sensing reflected RF energy. The transmitter section 60 includes a varactor diode 92 which controls the frequency output of a GUNN diode 94, the combination functioning as a voltage controlled oscillator (VCO) which is connected to antenna 32 and which controls the frequency and wavelength of the transmitted RF energy.

The mixer 90 in the receiver section 62 is connected by way of line 44 to a first op-amp stage 96 which compares the mixer output voltage to a reference voltage on line 98 and generates a first error signal on line 100 to form an input to a second high-gain op-amp stage 102. An input signal on line 72 from the light detector 54 is connected at terminal 104 and is used to control the base of a switching transistor 106 to trigger the generation of a mid-range or reference measurement. When the light beam from source 50 is blocked by the can 24, this measurement is enabled, and the gain of the first op-amp stage 96 is high. When the light beam is present and the measurement is disabled, the gain of first op-amp stage 96 is much lower.

The second op-amp stage 102 generates a high gain error signal on line 66 which can be measured at test point TP. This signal also serves as an input to a third op-amp stage 110 in the reference circuit 64, where stage 110 is a follower and buffer stage. The output of the op amp stage 102 is the buffered error voltage signal which is supplied by way of line 42 to varactor diode 92 in transmitter 52, and by way of line 68 to the linearizing and scaling circuit 70. Circuit 70 converts the buffered error voltage signal on line 68 to a linear voltage signal on line 80 which is variable from 2 to 10 volts, for example, thus generating the output signal "V output" which conforms to an industry standard for computer data acquisition circuitry. The V output signal is sampled by the computer controller 82 for use in determining whether the can 24 is defective.

Op amp 110 provides an amplified error voltage signal on line 122 which is fed by way of line 124 to a mid-range indicator circuit, shown generally at 126. Circuit 126 includes three Light Emitting Diodes (LEDs) 128, 130 and 132, labeled "HI," "CTR" and "LO," respectively. These are used to adjust the height of the sensor 20, as will be discussed in further detail below.

In operation, varactor 92 functions as a voltage controlled oscillator (VCO) along with GUNN diode 94. The purpose of the VCO is to vary the frequency and wavelength of the transmitted RF energy. The phase relationship between the transmitted and reflected RF energy waves is maintained at a constant value by adjusting the frequency of the transmitted waves as the distance to a target can changes as the can moves past the antenna. This frequency adjustment operates to maintain a standing wave condition between the radar transceiver and the can top 28, even as the distance to the point of interest (directly under antenna 32) on the can top changes. The frequency control op-amp stages in the reference circuit 64 monitor the superposed transmitted and reflected RF wave energy at the mixer diode 90 to maintain a node (i.e. a minimum voltage value) at the mixer diode. The reference circuit 64 also maintains a fixed number of half wavelength intervals between the transceiver 34 and the can end 28.

The varactor VCO voltage is the buffered error voltage signal on lines 42 and 68 which changes as the distance to the point of interest on the can top 28 changes. Since the change in frequency results from, and thus is a function of, the change in distance to the can top 28, the buffered error voltage signal from buffer stage 164 to the VCO is, at any given instant in time, a measure of the relative distance to the can top 28 with respect to initial distance setting of the antenna. Thus, the change in voltage to the VCO is used to measure the profile of the can top.

Figure 4:
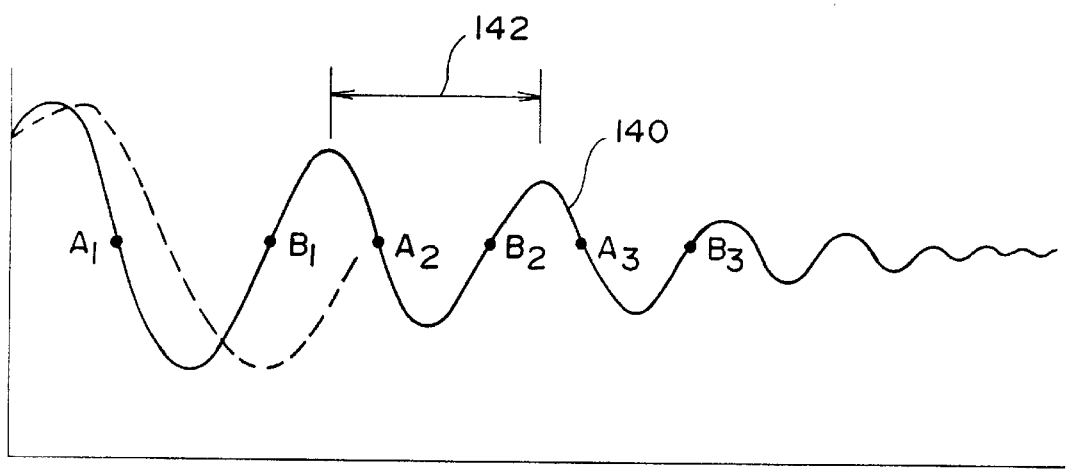
FIG. 4 illustrates the mathematical relationship between distance and the non-returned mixer output level of the transceiver of the present invention.

Curve 140 in FIG. 4 illustrates the mathematical relationship between the distance to the can top and the mixer output if varactor tuning were not present. Retuning causes the circuit to "lock" at "A" or "B". As the transmitted frequency is decreased, the wavelength distance 142 is increased, and as the frequency is increased, the wavelength 142 is decreased. The varactor 92 is adjusted to have a standing wave with a node at the mixing diode 90 and a fixed number of half wavelengths to the can end 28 as it passes the antenna 32.

Figure 5:
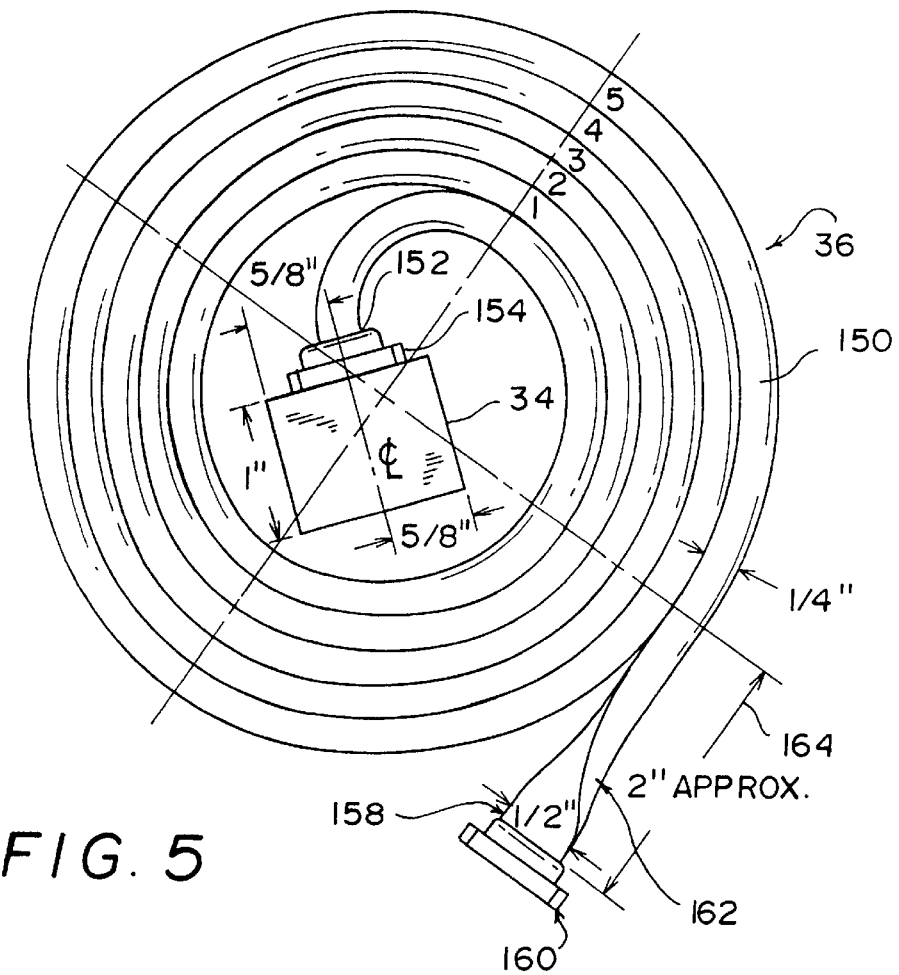
FIG. 5 illustrates in plan view a delay line for use in the radar sensor of the present invention.

If the can end profile has too great a distance deviation, then the VCO may lose lock by encountering a changed number of half wavelengths to the can end. If this occurs, a range ambiguity prevents the sensor 20 from tracking the can surface as a continuous function of time, and the measurement fails. Therefore, it is important that the useful variation of distance measurements for the radar sensor 20 be large enough to accommodate all possible container top variation measurements. This is accomplished by the use of the transmission line 36 between the transceiver 34 and the antenna 32. Such a transmission line (or delay line) 36 is illustrated in FIG. 5 as a coiled copper waveguide 150 having, for example, a rectangular cross-section of 0.5 by 0.25 inches and a total extended length of approximately six feet. The exact length is not important, but must be the same in each sensor of a multi-sensor system.

An inner end 152 of the delay line 36 has an inner flange 154 which is connected to transceiver 34. In the embodiment illustrated in FIG. 5, the waveguide is bent to a starting arc having an inside diameter of approximately 1.375 inches and is wound tightly in a flat coil. An outer end 158 has an outer flange 160, for connection to the antenna. A one-quarter twist, indicated at 162, with a length of approximately 2 inches is used in the region 164 proximate to the outer end 158.

Delay line 36 is used to increase the number of half wavelength intervals between the transceiver 34 and the surface of container 24 which is to be measured to increases the useful range of measurement for the radar sensor 20. This is important because, as noted above, the sensor measures a change in relative distance, not an absolute distance, and this change in relative distance must occur within the wavelength variation limits of the transceiver. For an upper K band transceiver at 24.125 GHz, one half wavelength is approximately 0.24 inches. With the sensor of the present invention, the maximum frequency deviation is approximately (plus or minus) 82 Mhz. With this tuning range, and without the delay line 34, the useful range of measurement would be limited to a variation on the order of a few thousandths of an inch. With a six foot long delay line 34, over two hundred half-wavelengths are propagated between the transceiver 50 and the antenna 32. In the delay line the changes in all the wavelengths are additive. This can be visualized as a stretching coil spring with many coils, where each coil stretches a small amount but the cumulative effect is to stretch the length of the spring a larger amount. The additive result of the two hundred elongations in the transmission line is to multiply the useful range of measurement by more than 100, to approximately one inch of range.

Figure 6A:
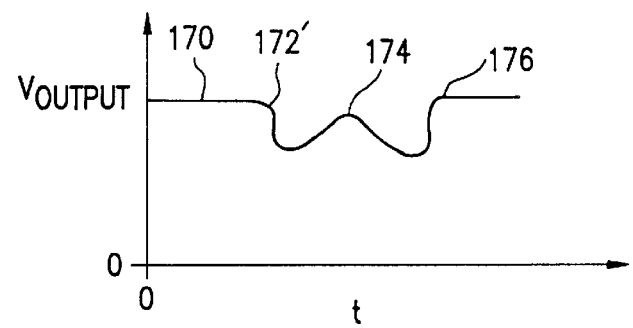
FIG. 6a illustrates the mathematical relationship between voltage and time for the sensor output of the present invention, when measuring a can's contour.

The pressure in the can 24 may be derived from either the curvature or profile of the can end 28, or from the frequency and amplitude of its vibration, as previously noted. These are measured by sampling a number of distance measurements over the short period of time required for the can end 28 to pass beneath the antenna 32 on the conveyor 48. The range profile is represented by plotting the "V output" as a function of time, as illustrated in FIGS. 6a and 6b by curves 170 and 172, respectively.

In the profile measurement embodiment, as the can 24 first passes light sensor 52, a measurement is triggered at point 172 of curve 170. The example shown in FIG. 6a corresponds to a can 24 under pressure and having a slightly domed can end 28. As the domed center of the can end 28 passes beneath the antenna 32, a local maximum is plotted at point 174. As the can moves past the antenna, light sensor 52 detects the passing of the can and the measurement is disabled at point 176. The computer 82 which has periodically sampled the V output to obtain this curve, then generates an estimate of the can's internal pressure based upon the profile of the can end wall. The computer 82 can also generate an estimate of whether the can 24 is flawed due to manufacturing defects such as being dented or crushed, based upon the profile of the can end.

Figure 6B:
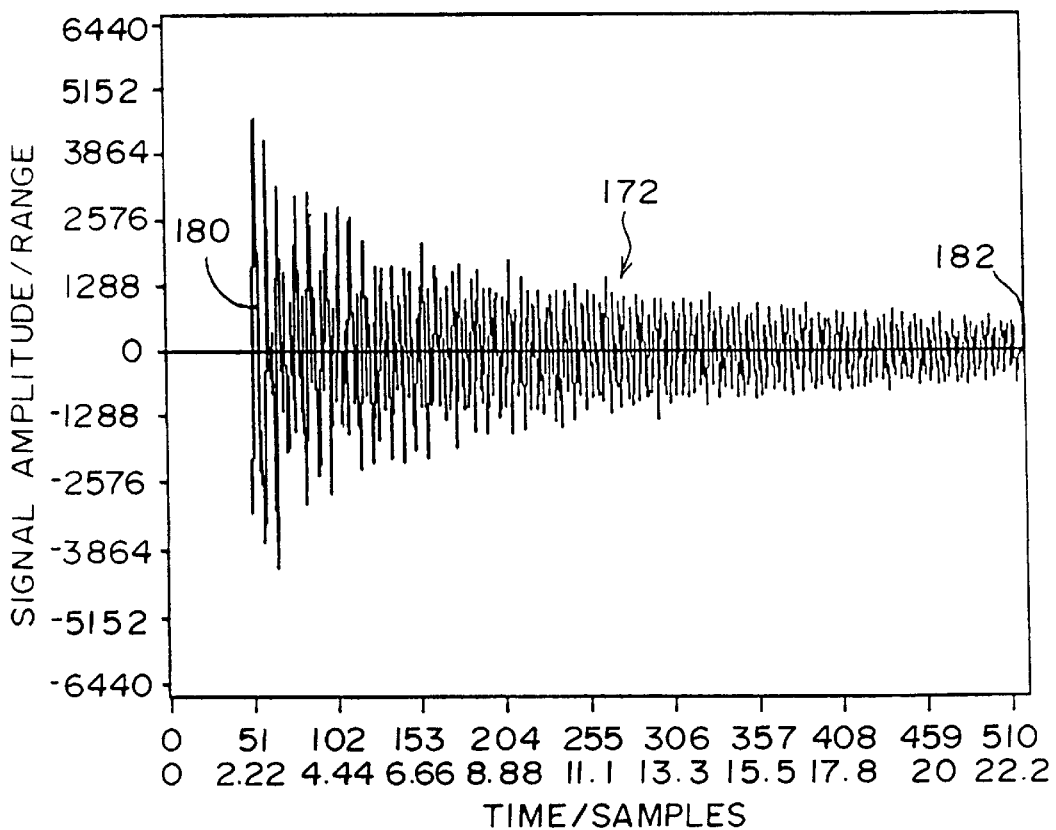
FIG. 6b illustrates sampled signals for a can under pressure and vibrating.

In the vibration measurement embodiment in FIG. 6b, illustrated by curve 172, as the can 24 first passes light sensor 42, the sampling of a range measurement is triggered approximately at point 180. FIG. 6b is an example of sampled signals acquired by the computer 82 for a can 24 under pressure and vibrating with a frequency and amplitude characteristic of the relative internal pressure in the can. The first measurement sample taken at point 180 was taken after a delay following the excitation of the can by a magnetic pulse generated by coil 56. Point 182 corresponds to the last of the series of range measurement samples taken as the can 24 passes under the antenna 32. In the sequence of measurements between 180 and 182 the vibration of can end 28 decays in amplitude due to damping effects. Once the can has passed, the computer 82 performs a frequency spectrum analysis of the acquired measurement signal. From this analysis, the computer 82 determines whether the resonant vibration characteristic indicate the can 24 has an acceptable or unacceptable internal pressure.

The method of using the non-contacting container internal pressure analysis sensor 20 includes, in the most general terms, orienting the radar antenna 32 toward a selected position on the conveyor 48 and irradiating that selected position with a transmitted radar signal. The selected position is defined by the location of the optical sensor set 50, 52 and antenna 32. The can 26 is conveyed through the selected position, thereby providing a reflected radar signal which is sensed in the transceiver. A distance signal, or V output, is generated as a feedback control for the transmitter by a control circuit, and an estimate of the container wall profile or its resonant vibration characteristics are then generated from the distance signal.

A temporal approach to a generalized description of method for measuring a profile of a surface on a can or some other article includes the steps of illuminating a first point on the surface of the article with transmitted RF energy from the antenna 32, thereby generating a first reflected RF energy signal; receiving the first reflected RF energy signal; generating a first output signal, or V output, in response to the first reflected RF energy signal and then moving one or both of the can or the antenna, thereby illuminating a second point on the surface of the can. This generates a second reflected RF energy signal and the steps of receiving the reflected RF energy signal and generating an output signal in response to the reflected RF energy signal are repeated. The first output signal is then compared with the second output signal, thereby generating a relative distance measurement in computer 82. The steps are repeated continuously as the can moves past the antenna to generate a series of measurements. Next, an accept signal or a reject signal is generated in response to an analysis performed by the computer on the series of measurements, in which the measured variations in distance are compared with a standard profile.

Figure 7:
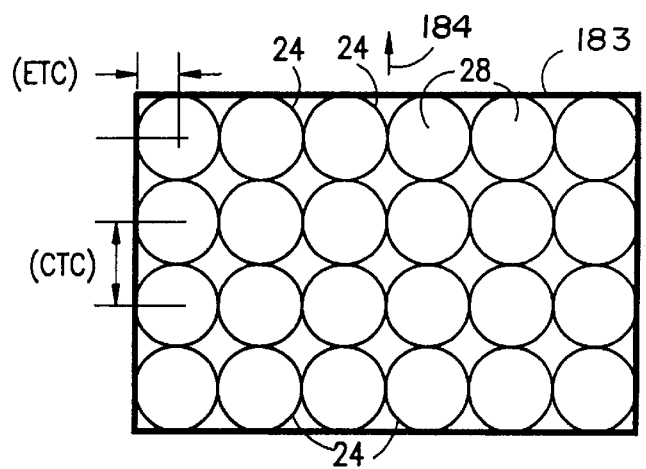
FIG. 7 is a top plan view of 24 containers packed in a case.

Sensor 20 can beneficially be used to measure individual cans or other containers having flexible walls as described above but the most valuable application may be in the measurement of multiple cans 24 packed in a case or carton, such as the case 183 illustrated diagrammatically in FIG. 7. This is the usual configuration for cans of beverages, for example, packed for shipment, with each can 24 having an edge-to-center dimension ETC and, packed as shown, a center-to-center dimension CTC. Such cases are usually transported along conveyors in the direction 184 shown in FIG. 7 for inspection purposes. To measure the pressure in all 24 of the cans in case 183, six radar sensors 20 will be configured in a linear array transversely across the path of the conveyor, and each sensor will measure four cans, one after another in each case.

Figure 8:
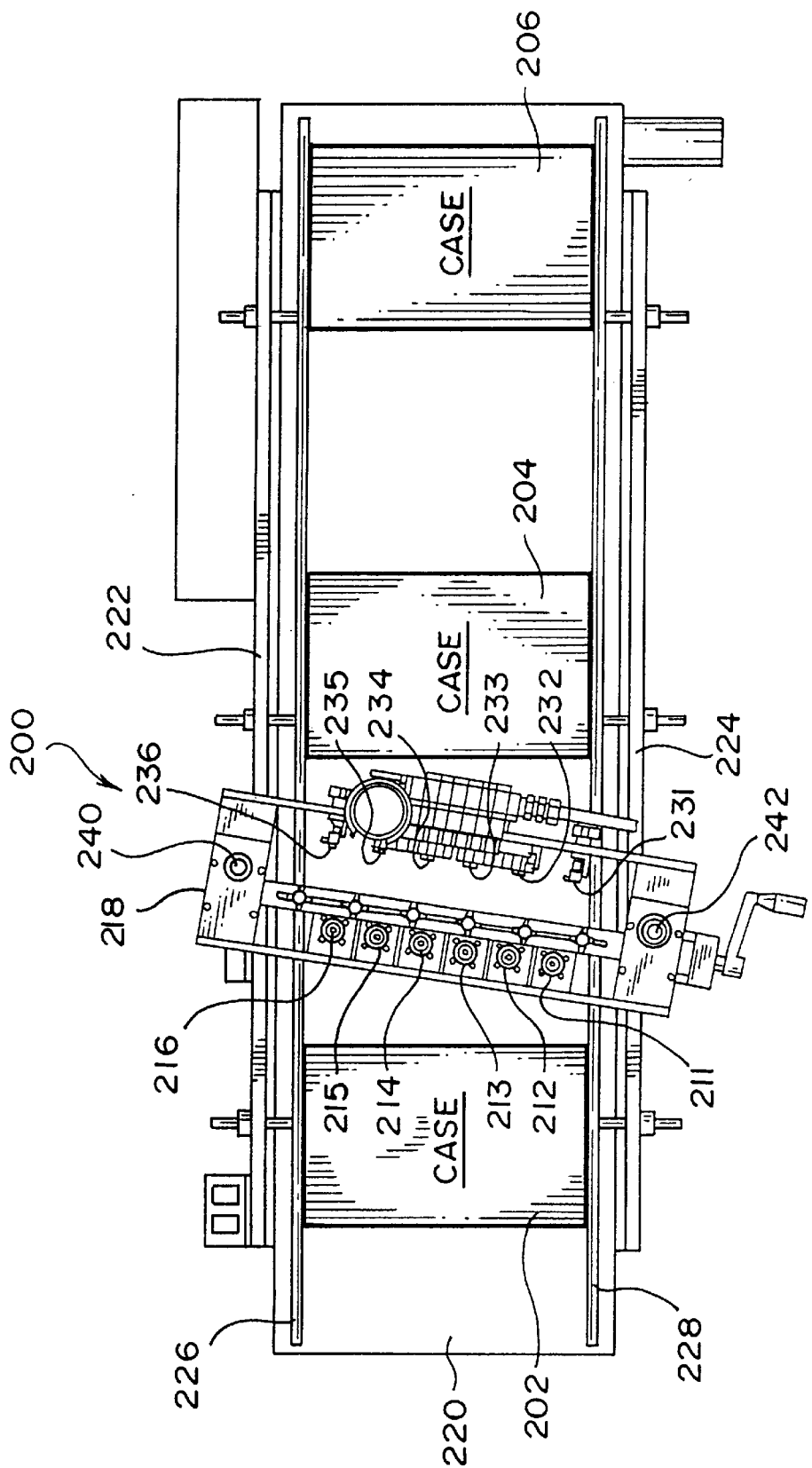
FIG. 8 is a top plan view of a container inspection system for measuring containers packed in cases.

As illustrated diagrammatically in FIG. 8, a container inspection system 200 for measuring containers (not shown) packed in closed cases such as the cases 202, 204, 206, includes six radar sensors 211, 212, 213, 214, 215, and 216 mounted on an adjustable transducer bridge 218 which extends transversely across a conveyor 220 for the cases. The bridge is carried by support rails 222 and 224 and is movable along the rails to support the sensors over the cases as they travel on the conveyor. The cases are held in alignment on the conveyor by guide rails 226 and 228 so they move in a straight line under the sensors. The bridge 218 may be oriented perpendicularly to the direction of conveyor travel or may be angled slightly, as shown in FIG. 8, to allow the sensors to be aligned with the container surfaces to be measured. Preferably, the sensors are aligned with the centers of corresponding rows of cans in the cases. The spacing between the sensors 211–216 is adjustable, but they are preferably equally spaced along the bridge, with the distance being set to span the CTC distance illustrated in FIG. 7.

The sensors share the transducer bridge 218 with six spray markers 231, 232, 233, 234, 235 and 236. If a can having an unacceptable profile is detected, one of the cases, for example by sensor 216, then sprayer 236 will mark the case, with the mark being positioned to identify the location within the case of the defective can.

FIG. 9 is a front view of the measurement bridge of FIG. 8, illustrating a mechanism by which the height of the transducer bridge 218 is adjustable. Vertical supports 240 and 242 are mounted on rails 222 and 224 and bridge 218 is movable up or down these supports to accommodate cases 202 of differing sizes. The resulting adjustable spacing between the bottom 244 of the bridge and the top 246 of the case is the standoff distance of the system. In the present invention, the transducer bridge is preferably lowered so that the bottom 244 of bridge 218 is as close as possible to the top 246 of the case 202. The permissible transducer bridge height, or standoff range, is limited only by the power of the transmitter section 60, the sensitivity of the receiver section 62 and the sensor's useful range of measurement, as discussed above.

The container inspection system of the present invention is calibrated by first placing a radar deflector on the stationary conveyor belt surface, directly beneath the radar sensor antenna for the sensors 211–216. The deflector is angled at 45 degrees from horizontal to reflect the transmitted RF energy away from the antennae so that there is no measurable target for the sensor. Next, the operator blocks the light beam, thus enabling the reference circuits of the sensors, and adjusts a REF SET potentiometer 250 in reference circuit 64 to cause the green (CIR) lamp to illuminate. This procedure is repeated for sensors 212–216. Next, the operator removes the radar deflector from the conveyor surface and the sensors 211–216 will then simultaneously lock on the conveyor surface and the centering indicators 126 of each sensor will indicate whether the transducer bridge 218 is too high or too low for proper operation of the sensors. If the HI LED 128 lights, the transducer bridge should be lowered, whereas if the LO LED 132 lights, the transducer bridge should be raised. If, however, the CTR LED 130 lights, the transducer bridge is in a position which will permit proper operation.

The foregoing describes the preferred embodiment of the present invention along with a number of alternatives. A person of ordinary skill in the art will recognize that modifications of the described embodiments may be made without departing from the true spirit and scope of the invention. For example, this sensor and the methods for using this sensor could be used in sensing a surface profile for any article, be it an article of manufacture or some other article which is packaged for shipping before inspection. Similarly, this sensor could be used to analyze the vibration of any conductive surface, be it an article of manufacture or an assembled structure. The invention is, therefore, not restricted to the embodiments disclosed above, but is defined in the following claims.

I claim:

1. A sensor for use with container inspection systems, said sensor comprising:
   a tunable radio frequency (RF) transmitter for generating an RF energy signal having a first frequency;
   an RF receiver for receiving an RF energy signal having said first frequency;
   an antenna;
   a waveguide connected at a first end to said transmitter and to said receiver and connected at a second end to said antenna to direct generated RF energy signals from said transmitter toward the wall of a container to be inspected and to receive RF energy reflected from the container wall and to direct received RF energy to said RF receiver; said reflected energy being nominally in chase with said generated energy at said RF receiver; and
   a measurement circuit responsive to the phase relationship between said received reflected RF energy signal and said generated RF energy signal to generate an output signal which corresponds to changes in the distance between said between said antenna and the container wall, said tunable RF transmitter being responsive to changes in said chase relationship to change the frequency of said RF energy signal.

2. The sensor of claim 1, further comprising means for moving the container in relation to the antennae and a computer for sampling said output signal to generate a profile for the container end wall.

3. The sensor of claim 1, further comprising means for moving the container in relation to the antenna to cause said RF energy signals from said antenna to scan across said container wall.

4. The sensor of claim 1, further comprising a light detector for triggering said sensor in response to the presence of a container.

5. The sensor of claim 1, wherein said waveguide is a long delay line.

6. A sensor for a container inspection system for measuring an instantaneous distance to a container end wall, said sensor comprising:
   a tunable radio frequency (RF) transmitter, said transmitter generating an RF energy signal;
   an RF receiver including a mixer to receive a reflected RF energy signal and to produce a mixer output signal;
   a waveguide connected at one end to said transmitter and to said receiver;
   an antenna connected to a second end of said waveguide, said antenna directing said generated RF energy signal toward a container end wall to thereby produce a reflected RF energy signal and, said antenna receiving said reflected RF energy signal, said generated and reflected RF signals propagating as a standing wave signal within said waveguide and having a node at said mixer; and a measurement circuit responsive to said mixer output signal to generate a measurement signal which corresponds to the distance between said antenna and the container end wall, said measurement signal being connected to said transmitter to vary the frequency of said RF energy signal to maintain said node at said mixer.

7. The sensor of claim 6, further including means for sampling said measurement signal and determining changes in the distance between the antenna and the container wall.

8. The sensor of claim 6, further including computer means for a sampling said measurement signal and for generating therefrom an estimate of internal pressure in the container.

9. The sensor of claim 6, further including computer means for sampling said measurement signal and for generating therefrom an estimate of whether the container is flawed due to manufacturing defects.

10. The sensor of claim 6, further including:

computer means for sampling said output signal and performing a frequency spectrum analysis of said signal to measure the vibration of the container wall.

11. The sensor of claim 6, wherein said waveguide is sufficiently long to enable said transmitted and reflected RF signals to propogage a standing wave having multiple half-wavelengths.

12. The sensor of claim 11, further including means for moving a container with respect to said antenna to cause said RF energy signals from said antenna to scan said container wall, variations in the distance between said antenna and said container wall moving said node with respect to said mixer.

13. A method for measuring the profile of a container wall, comprising:

providing a radar antenna which is aimed toward a selected position on a conveyor;

irradiating the selected position with a transmitted radar signal having a selected frequency;

conveying a container through the selected position to generate reflected radar signals;

sensing the reflected radar signal;

varying said selected frequency of the transmitted radar signals in response to changes in the second reflected radar signal; and generating an estimate of the profile of the container wall from variations in the frequency of the transmitted signals.

14. The method of claim 13, wherein the step of sensing the reflected radar signal includes the steps of:

establishing a standing wave based on said transmitted and reflected radar signals;

measuring changes in said standing wave at a receiver mixer diode; and producing a frequency contact voltage corresponding to said changes for varying said selected frequency.

15. A method for measuring a profile of a surface on a manufactured article, comprising:

illuminating a first point on the surface of the article with transmitted RF energy from an antenna, thereby generating a reflected RF energy signal;

receiving said reflected RF energy signal;

generating a feedback signal in response to said reflected RF energy signal;

repeatedly moving one of either the article or the antenna to illuminate a series of points on the surface of the article to generate a corresponding series of additional reflected RF energy signals;

receiving said series of reflected RF energy signals;

generating a series of feedback signals in response to said series of reflected RF energy signals, said series of feedback signals corresponding to changes in the distance between the antenna and the surface of the article;

varying the frequency of the transmitted RF signal in accordance with said feedback signal; and determining from said a series of feedback signals an article profile.

16. The method of claim 15, further including generating an accept signal or a reject signal in response to said article profile.

17. The method of claim 15, wherein determining an article profile includes comparing the phase of said received signals with the phase of said transmitted signals to obtain said feedback signals, said feedback signals corresponding to the instantaneous distance between the antenna and the surface of the article for each of said series of points.

18. A method for measuring the resonant vibration frequencies and amplitudes of a surface on a manufactured article, comprising:

causing the surface of the article to vibrate;

illuminating a first point on said surface with transmitted RF energy from an antenna, thereby generating a first reflected RF energy signal;

receiving said first reflected RF signal at a receiver;

generating a first output signal, in response to said first reflected RF energy signal;

successively illuminating points on said surface with transmitted RF energy from an antenna,receiving the reflected RF signal, and generating feedback signals in response to the reflected RF energy;

varying the frequency of the transmitted RF energy in response to changes in said feedback signals;

analyzing a series of said feedback signals to measure the resonant surface vibration frequencies and amplitudes;

comparing the said surface vibration frequencies or amplitudes to the surface vibration frequencies or amplitudes of said articles with acceptable and unacceptable internal pressure; and classifying the said article as having either acceptable or unacceptable internal pressure.

19. The method of claim 18, wherein causing said surface to vibrate includes generating an electromagnetic pulse to initiate vibration of the surface to be measured.

20. The method of claim 19 further including connecting said antenna to said receiver through a transmission line, and selecting the transmission line length to achieve optimum distance resolution and range.

* * * * *

UNITED STATES PATENT AND TRADEMARK OFFICE
CERTIFICATE OF CORRECTION

PATENT NO. : 5,869,747
DATED : February 9, 1999
INVENTOR(S) : William H. Hulsman It is certified that error appears in the above-identified patent and that said Letters Patent is hereby corrected as shown below:

Claim 1, line 23 (col. 12, line 38); change "chose" to --phase--.

Claim 1, line 15 (col. 12, line 30); change "chase to -- phase --.

Claim 1, line 21 (col. 12, line 36) cancel "between said" (first occurrence).

Claim 14, line 7 (col. 13, line 59) change "contact" to -- control --.

Claim 15, line 20 (col. 14, line 18) cancel "a".

UNITED STATES PATENT AND TRADEMARK OFFICE
CERTIFICATE OF CORRECTION

PATENT NO. : 5,869,747
DATED : February 9, 1999
INVENTOR(S) : William H. Hulsman It is certified that error appears in the above-identified patent and that said Letters Patent is hereby corrected as shown below:

Item [73] and [75] of the heading for the patent to read as follows:

[75] Inventor: William H. Hulsman, 25 Happy Hollow Road, East Falmouth, Massachusetts 02536

[73] Assignee: Benthos, Inc., North Falmouth, Massachusetts

Signed and Sealed this

Eleventh Day of January, 2000

Attest:

Q. TODD DICKINSON

*Attesting Officer*   *Acting Commissioner of Patents and Trademarks*